(12) United States Patent
Park et al.

(10) Patent No.: US 10,611,103 B2
(45) Date of Patent: Apr. 7, 2020

(54) TIRE REPAIR TOOL AND METHOD OF REPAIRING A TIRE PUNCTURE WITH TIRE PLUGS

(71) Applicant: Bell Sports, Inc., Scotts Valley, CA (US)

(72) Inventors: Stephen C. Park, San Jose, CA (US); Mark J. Matson, Santa Cruz, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 147 days.

(21) Appl. No.: 15/702,519

(22) Filed: Sep. 12, 2017

(65) Prior Publication Data

US 2019/0077099 A1      Mar. 14, 2019

(51) Int. Cl.
| B29C 73/06 | (2006.01) |
| B29C 73/08 | (2006.01) |
| B29L 30/00 | (2006.01) |

(52) U.S. Cl.
CPC ............. B29C 73/08 (2013.01); B29C 73/06 (2013.01); *B29L 2030/00* (2013.01)

(58) Field of Classification Search
CPC ......... B29C 73/08; B29C 73/06; B29C 73/26; B29C 2073/262; B29C 73/28; B29C 73/12; B29L 2030/00
See application file for complete search history.

(56) References Cited

U.S. PATENT DOCUMENTS

| 570,664 A | 11/1896 | Heywood |
| 573,049 A | 12/1896 | Syme |
| 1,385,591 A | 7/1921 | Stafiej |
| 2,828,657 A * | 4/1958 | Fromberg ............... B29C 73/08 81/15.7 |
| 2,966,190 A | 12/1960 | Nowotny |
| 3,426,826 A * | 2/1969 | Brandt .................... B29C 73/06 152/370 |
| 3,785,896 A | 1/1974 | Kassel |
| 4,548,102 A | 10/1985 | Dirocco |

(Continued)

FOREIGN PATENT DOCUMENTS

| CN | 2803685 | 8/2006 |
| FR | 1320730 | 3/1963 |

OTHER PUBLICATIONS

Dynaplug® Ultralite—Tubeless Tire Repair Kit Dynaplug Source: http://www.dynaplug.com/products.html Publication Date: Feb. 26, 2013 Date Accessed: Dec. 29, 2016.

*Primary Examiner* — Robert J Scruggs
(74) *Attorney, Agent, or Firm* — Walter M. Egbert, III; Gerard M. Donovan; Reed Smith LLP

(57) ABSTRACT

A tire repair tool assembly includes a tool body, at least one tire plug, a plug storage cap, and a hollow tube. The tool body may have a first end and a second end opposite the first end, the tool body having a storage compartment within the tool body, the storage compartment having an opening at the first end. The plug storage cap may be operably coupled to the first end of the tool body. The hollow tube may be sized to receive a first end of the at least one tire plug within the hollow tube, the hollow tube extending from the second end of the tool body and having a tip distal from the second end of the tool body. The tire repair assembly may further include a tool body case having a closed end and an open compartment within the tool body case.

14 Claims, 10 Drawing Sheets

(56) References Cited

U.S. PATENT DOCUMENTS

| | | |
|---|---|---|
| 4,930,377 A | 6/1990 | Lester |
| 4,936,168 A | 6/1990 | Willingham et al. |
| 4,951,531 A | 8/1990 | Nishio |
| 5,536,346 A | 7/1996 | Hendnry et al. |
| 5,746,851 A * | 5/1998 | Smith ................... B29C 73/06 152/370 |
| 6,080,922 A * | 6/2000 | Dimbath ................ G10G 5/005 84/327 |
| 6,170,361 B1 | 1/2001 | Yates |
| 7,013,516 B1 * | 3/2006 | Peters ..................... B25D 1/02 7/146 |
| 8,707,829 B2 | 4/2014 | Kerner |
| 9,061,470 B2 | 6/2015 | Cole |
| 2008/0105090 A1 | 5/2008 | Lin |
| 2008/0265453 A1 | 10/2008 | Brazeau |
| 2014/0298956 A1 * | 10/2014 | Kerner ................... B29C 73/08 81/15.7 |
| 2016/0082678 A1 | 3/2016 | Rivera |

\* cited by examiner

TIRE REPAIR TOOL AND METHOD OF REPAIRING A TIRE PUNCTURE WITH TIRE PLUGS

TECHNICAL FIELD

Aspects of this document relate generally to repairing a puncture to a tubeless tire with tire plugs, and more specifically to a tire repair tool assembly and methods of repairing a tire puncture to a tubeless tire using the tire repair tool assembly.

BACKGROUND

Tires are essential components of a vehicle, such as a bicycle or a motor vehicle. Many tires are tubeless. That is, the tire does not have an inner tube to hold air. When the tire is punctured, air leaks out from the puncture. Although liquid sealant pre-deposited in the tire may move around and block air leak from small punctures, this mechanism does not work for big punctures. Further, by the time a puncture is noticed from the hissing noise of air leaking or the difficulties encountered in riding or driving, the punctures have not been plugged by the pre-deposited sealant. Moreover, not all tires have liquid sealant pre-deposited inside the tire. Therefore, tools are needed to plug the puncture to block the air from further leaking out.

SUMMARY

According to an aspect of the disclosure, a tire repair tool assembly comprises a tool body, at least one tire plug, a plug storage cap, a hollow tube, and a tool body case. The tool body may have a first end and a second end opposite the first end, the tool body having a storage compartment within the tool body, the storage compartment having an opening at the first end. The at least one tire plug may be coupled to a first tire plug sheet within the storage compartment. The plug storage cap may be removably coupled to the first end of the tool body. The hollow tube may be sized to receive a first end of the at least one tire plug within the hollow tube. The hollow tube may extend from the second end of the tool body and have an angled tip distal from the second end of the tool body. The tool body case may comprise a closed end and an open compartment within the tool body case. The open compartment may be sized to receive the hollow tube and the second end of the tool body within the open compartment, the tool body case configured to engage the tool body to removably retain the second end of the tool body within the tool body case.

Particular embodiments may comprise one or more of the following features. The at least one tire plug may be covered with adhesive. A second tire plug sheet coupled to the at least one tire plug so that the at least one tire plug is between the first tire plug sheet and the second tire plug sheet. The closed end of the tool body case may comprise a removable end cap adapted to open the closed end of the tool body case and expose the angled tip of the hollow tube. The tool body case may comprise a bracket on a first external sidewall of the tool body case, the bracket forming a passage between the bracket and the tool body case. A strap may be sized to pass through the passage for mounting the tire repair tool assembly to a bicycle. The tool body may be rotatably coupled or friction fit to the tool body case.

According to an aspect, a method of repairing a tire puncture comprises providing a tool body, inserting the first end of the tire plug into the hollow tube, folding the tire plug, pushing the tip of the hollow tube and the folded tire plug, and pulling the hollow tube out of the tire puncture and leaving the tire plug in the tire puncture. Providing a tool body comprises providing a tool body having a hollow tube sized to receive a first end of a tire plug within the hollow tube, the hollow tube extending from the tool body and having a tip distal from the tool body. Folding the tire plug at the tip of the hollow tube comprises folding the tire plug at the tip of the hollow tube such that a remaining portion of the tire plug extends along an outer surface of the hollow tube for a length of the remaining portion of the tire plug. Pushing the tip of the hollow tube and the folded tire plug comprises pushing the tip of the hollow tube and the folded tire plug into a tire through the tire puncture until only a portion of the remaining portion of the tire plug remains outside of the tire.

Particular embodiments may comprise one or more of the following features. Inserting the first end of the tire plug into the hollow tube may comprise inserting two tire plugs into the hollow tube. The tip may be an angled tip having a first side longer than a second side of the angled tip, and folding the tire plug at the tip of the hollow tube comprises folding the tire plug around the second side of the angled tip so that the first side extends beyond the folded tire plug. The method of repairing a tire puncture may further comprise removing the tire plug from a storage compartment within the tool body prior to inserting the first end of the tire plug into the hollow tube. The method may further comprise exposing the tip of the hollow tube from within an open compartment of a tool body case enclosing the hollow tube prior to inserting the first end of the tire plug into the hollow tube.

According to an aspect, a tire repair tool assembly comprises a tool body, at least one tire plug, a plug storage cap, and a hollow tube. The tool body may have a first end and a second end opposite the first end, the tool body having a storage compartment within the tool body, the storage compartment having an opening at the first end. The plug storage cap may be operably coupled to the first end of the tool body. The hollow tube may be sized to receive a first end of the at least one tire plug within the hollow tube, the hollow tube extending from the second end of the tool body and having a tip distal from the second end of the tool body.

Particular embodiments may comprise one or more of the following features. The tire repair tool assembly may further comprise a tool body case. The tool body case may comprise a closed end and an open compartment within the tool body case, the open compartment sized to receive the hollow tube and the second end of the tool body within the open compartment, the tool body case configured to engage the tool body to removably retain the second end of the tool body within the tool body case. The closed end of the tool body case may comprise a removable end cap adapted to open the closed end of the tool body case and expose the tip of the hollow tube. The tool body case may comprise a strip disposed along a second external sidewall of the tool body case. The tool body case may comprise a bracket on a first external sidewall of the tool body case, the bracket forming a passage between the bracket and the tool body case. The tire repair tool assembly may further comprise a strap sized to pass through the passage for mounting the tire repair tool assembly to a bicycle. The tip may be an angled tip having a first side longer than a second side of the angled tip. The at least one tire plug may be covered with adhesive.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶ 116. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶ 6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or acts in support of the function. Thus, even when the claims recite a "means for performing the function of . . . " or "step for performing the function of . . . ," if the claims also recite any structure, material, or acts in support of that means or step, or to perform the recited function, it is the clear intention of the inventors not to invoke the provisions of 35 U.S.C. § 112, ¶ 6. Moreover, even if the provisions of 35 U.S.C. § 112, ¶ 6, are invoked to define the claimed aspects, it is intended that these aspects not be limited only to the specific structure, material, or acts that are described in the preferred embodiments, but in addition, include any and all structures, material, or acts that perform the claimed function as described in alternative embodiments or forms in the disclosure, or that are well-known present or later-developed, equivalent structures, material, or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DETAILED DESCRIPTION

Figure 1A:
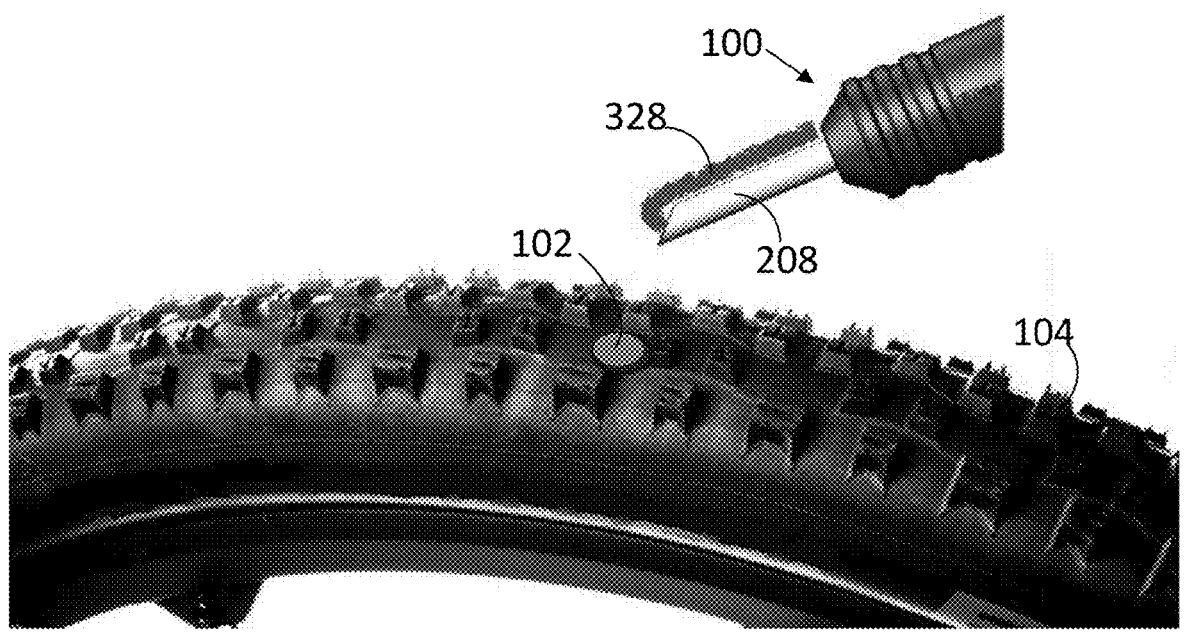
FIG. 1A is a perspective view of a part of a punctured tire and a tire repair tool assembly.

While this disclosure includes embodiments in many different forms, they are shown in the drawings and will herein be described in detailed particular embodiments with the understanding that the present disclosure is to be considered as an exemplification of the principles of the disclosed methods and systems, and is not intended to limit the broad aspect of the disclosed concepts to the embodiments illustrated.

When a tire is punctured, it is never at a convenient location or time. Often it is at a remote location that is inconvenient for repairs. Tire repair tools that are small and light weight are more convenient to permit the tire to be repaired quickly to get the vehicle back into operation.

Figure 1B:
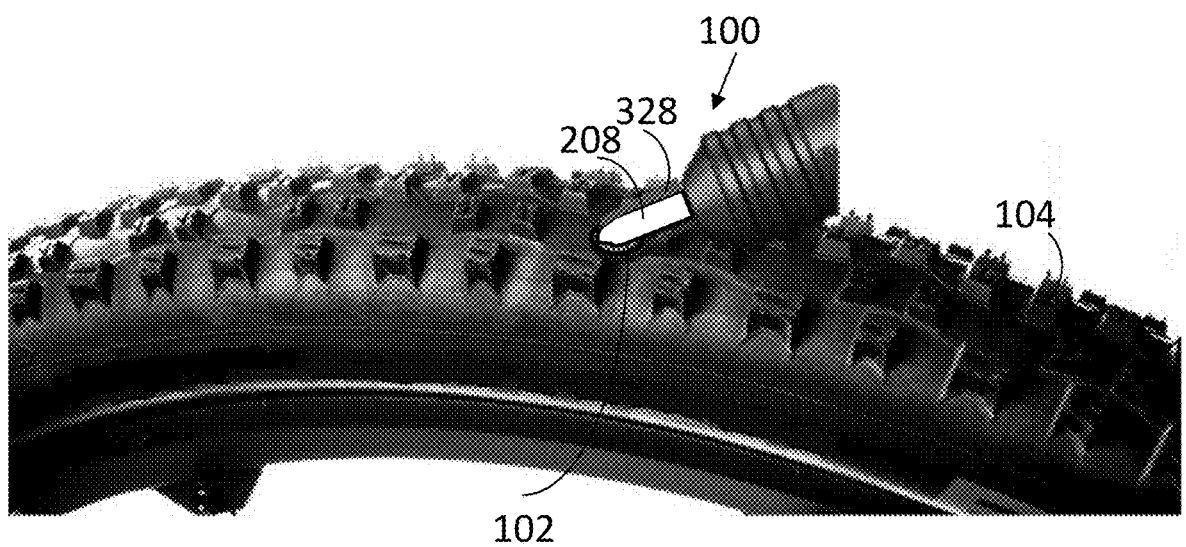
FIG. 1B shows the hollow tube of the tire repair tool assembly shown in FIG. 1A is partially pushed into the punctured tire.
Figure 1C:
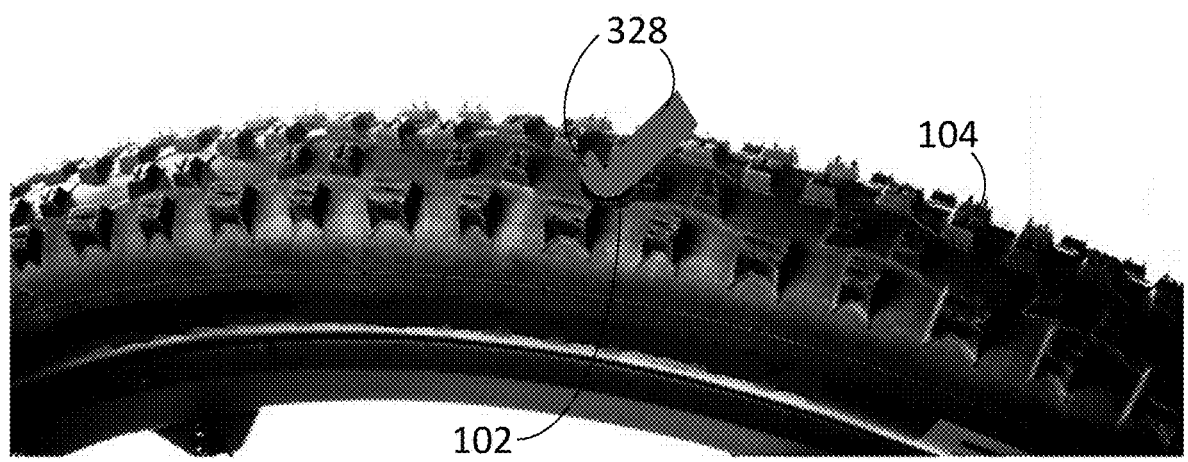
FIG. 1C shows the tire is repaired after the hollow tube of the tire repair tool assembly shown in FIG. 1A is pulled out of the tire.

Contemplated as part of this disclosure is a tire repair tool assembly that is used to effectively and quickly plug a puncture in a tubeless tire, as well as a method of plugging a puncture to a tubeless tire. FIGS. 1A-1C illustrate an example of repairing a puncture, tire puncture, or puncture hole 102 to a tire 104 using a tire repair tool assembly, tire plug tool assembly, or tool assembly 100. FIG. 1A shows a tire repair tool assembly 100 loaded with a plug or tire plug 328, FIG. 1B shows the hollow tube 208 and the plug 328 are partially inserted into the tire 104 at the puncture 102, FIG. 1C shows the tire 104 with the plug 328 having filled the puncture 102 and blocking the air from leaking out of the tire after the hollow tube 208 is pulled out of the tire 104.

Figure 2A:
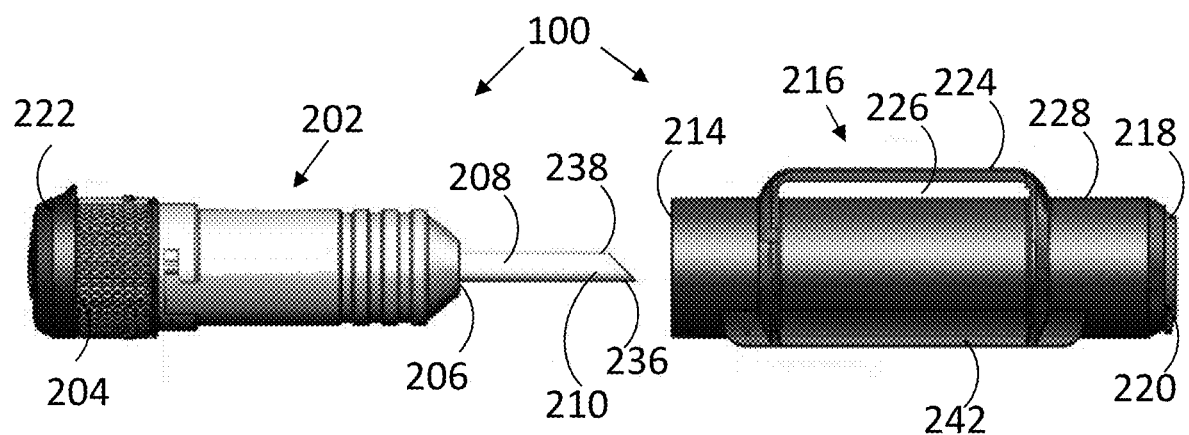
FIG. 2A is a side view of a tire repair tool assembly with its tool body case pulled apart from its tool body.
Figure 2B:
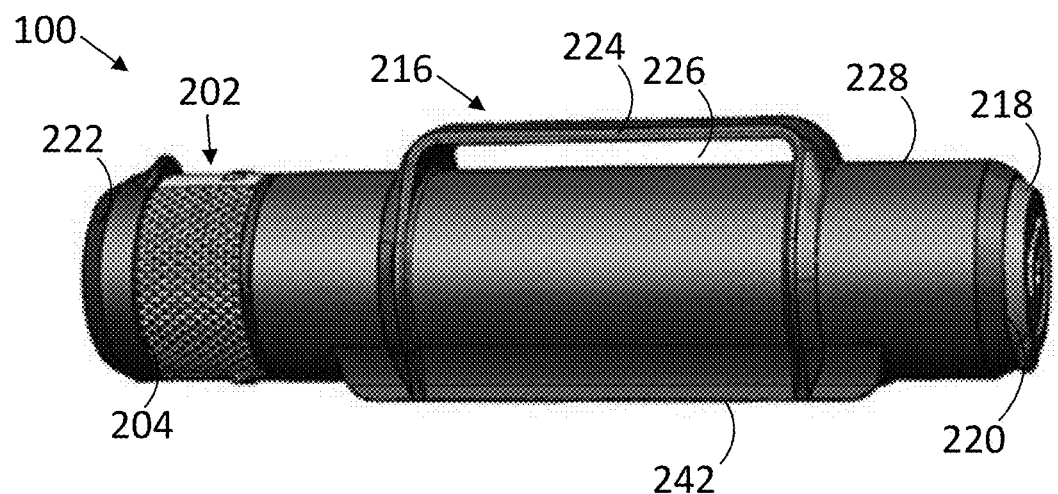
FIG. 2B is a side perspective view of the tire repair tool assembly shown in FIG. 2A with its tool body case partially enclosing its tool body.
Figure 3A:
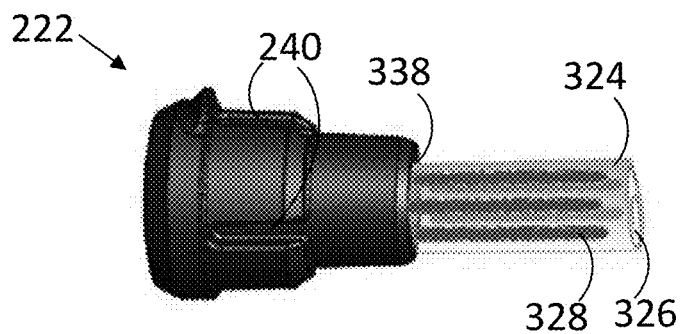
FIG. 3A is a side view of a plug storage cap.

A tire plug tool assembly 100 comprises a tool body 202, at least one tire plug 328, a plug storage cap 222, and a hollow tube 208 (FIGS. 2A and 2B). The plugs 328 may be stored in the plug storage cap 222 (FIG. 3A) and the hollow tube 208 extends from the tool body 202 (FIG. 2A). The tire plug tool assembly 100 may further comprise a tool body case 216. In the particular embodiment shown in FIGS. 2A and 2B, FIG. 2A shows a tool body 202 pulled out of the tool body case 216 and FIG. 2B shows the tool body 202 coupled with and partially enclosed by the tool body case 216. The tool body 202 may be rotatably coupled to the tool body case 216 or may be coupled with a friction fit or some other connection mechanism.

Figure 3B:
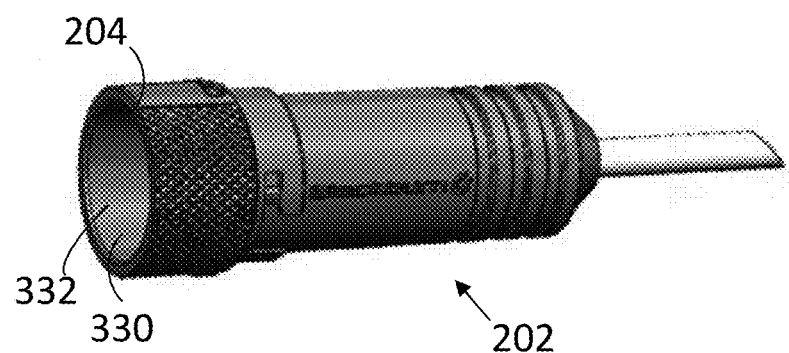
FIG. 3B is a side perspective view of a tool body and shows the tool body has a storage compartment, into which the plug storage cap shown in FIG. 3A can be inserted.

The tool body 202 has a first end 204 and a second end 206 opposite the first end 204. The tool body 202 has a storage compartment 330 (FIG. 3B) within the tool body 202. The storage compartment 330 has an opening 332 at the first end 204 of the tool body 202. A hollow tube 208 may extend from the tool body 202 at the second end 206.

Figure 4A:
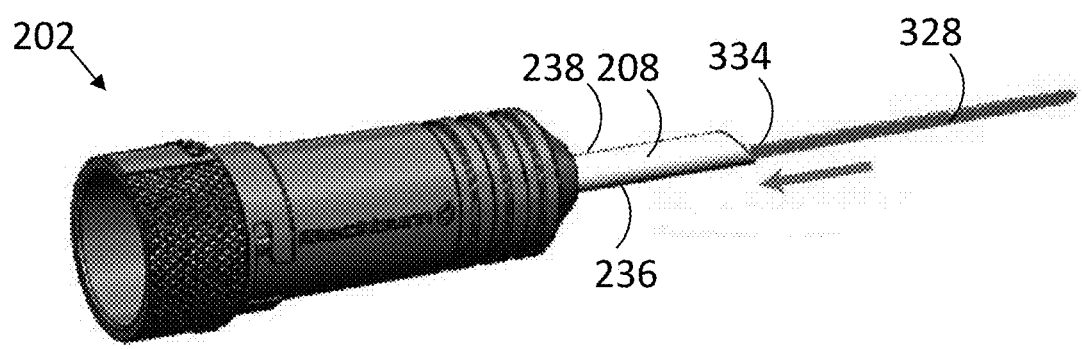
FIG. 4A is side perspective view of a tool body with the first end of a plug being inserted into the hollow tube of the tool body.

The hollow tube 208 is sized to receive a first end 334 of at least one tire plug 328 (FIG. 4A). The hollow tube 208 has a tip 210 distal from the second end 206 of the tool body 202. The tip 210 may be angled such that the first side 236 is longer than the second side 238. An angled tip can provide a sharp point to penetrate a puncture hole in the tire and deliver the plug into the puncture.

A plug storage cap 222 may be removably coupled to the first end 204 of the tool body 202 and be used to store plugs. In the particular embodiment shown in FIGS. 3A and 3B, the plug storage cap 222 may be made of rubber or other flexible material and have grooves 240 on its circumference so that the body of the cap can be squeezed and inserted into the storage compartment 330 of the tool body 202 and then expand and couple with the tool body 202. The body of the cap also forms a pocket 338 for storing plugs 328. The plugs 328 may be coupled to a first tire plug sheet 324 within the storage compartment 330 (FIGS. 2A-3B). A second tire plug sheet 326 may be used in the tire plug tool assembly 100 and also coupled to the plugs so that the plugs are between the first tire plug sheet 324 and the second tire plug sheet 326. The first and second tire plug sheets 324 and 326 may be made of plastic, waxed paper, or any material that reduces the likelihood of the tire plug sticking to it. The plug sheets, together with the plugs, may be rolled up and stored in the pocket 338 of the plug storage cap 222 so that the plugs can be easily accessible.

Figure 4B:
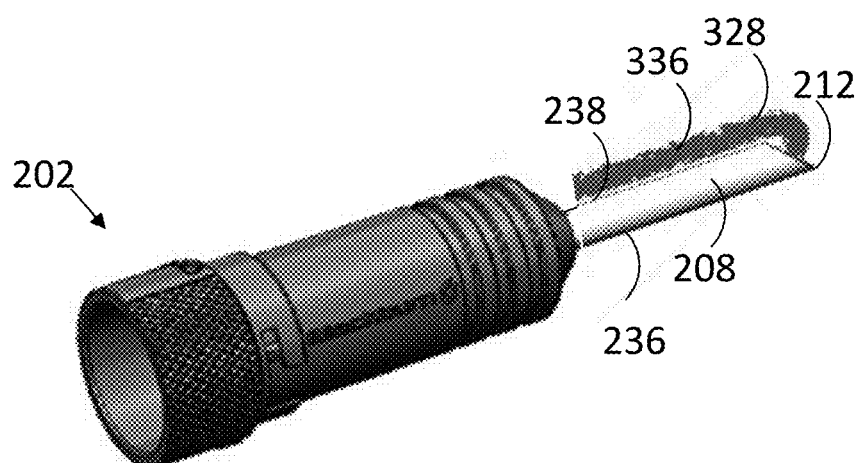
FIG. 4B shows the plug is partially inserted into the hollow tube of the tool body shown in FIG. 4A with the remaining part of the plug folded on the hollow tube.

A plug 328 may be covered with adhesive. A plug 328 may be a length of string covered with adhesive. The adhesive may be made of self-vulcanizing rubber. Before plugging a puncture, a plug may be loaded into the hollow tube 208 of the tool body 202 by inserting the first end 334 of the plug 328 into the hollow tube 208 with a portion of the plug 328 remaining outside of the hollow tube 208 and then folding the remaining portion 336 of the plug 328 on the hollow tube 208 (FIGS. 4A and 4B). The plug may be folded around the second side 238 of the angled tip 210 so that the first side 236 of the tip 210 extends beyond the folded tire plug 328 and the end 212 of the tip 210 is exposed. To plug the puncture 102, the tip 210 of the hollow tube 208 and the folded plug 328 is pushed into the tire 104 through the puncture 102 until only a portion of the plug 328 remains outside of the tire 104 and then the hollow tube 208 is quickly pulled out of the tire 104, leaving the folded plug 328 in the puncture 102 (FIGS. 1A-1C). Placing a plug in the puncture folded increases the size of the plug placed in the puncture for each repair, which saves time and increases the effectiveness of the plug and the efficiency of the repair.

Figure 5A:
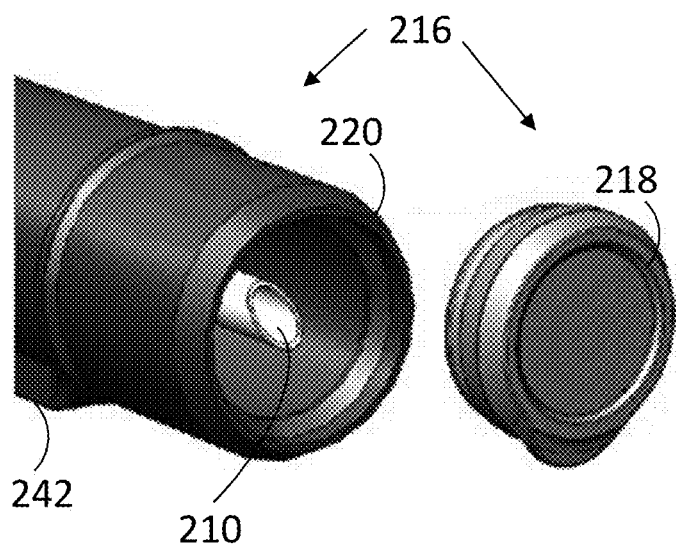
FIG. 5A is a perspective view of the closed end of a tool body case with the end cap of the tool body case pulled apart from the tool body case.

In the embodiment of FIGS. 2A and 2B, the tool body case 216 comprises a closed end 220 and an open compartment 214 within the tool body case 216. The open compartment 214 is be sized to receive the hollow tube 208 and the second end 206 of the tool body 202 within the open compartment 214. The tool body case 216 is configured to engage the tool body 202 to removably retain the second end 206 of the tool body 202 within the tool body case 216. The closed end 220 of the tool body case 216 comprises an end cap 218. The end cap 218 is removable and adapted to open the closed end 220 of the tool body case 216 and expose the tip 210 (FIG. 5A). To save time, a plug or plugs may be preloaded in the hollow tube. Two or more plugs may be twisted or stuck together before being preloaded into the hollow tube. The preloaded plug or plugs may fall out of the hollow tube and onto the inside of the tool body case 216. To retrieve the fallen plug or plugs, the end cap 218 may be removed from the tool body case and expose the plug or plugs.

Figure 6A:
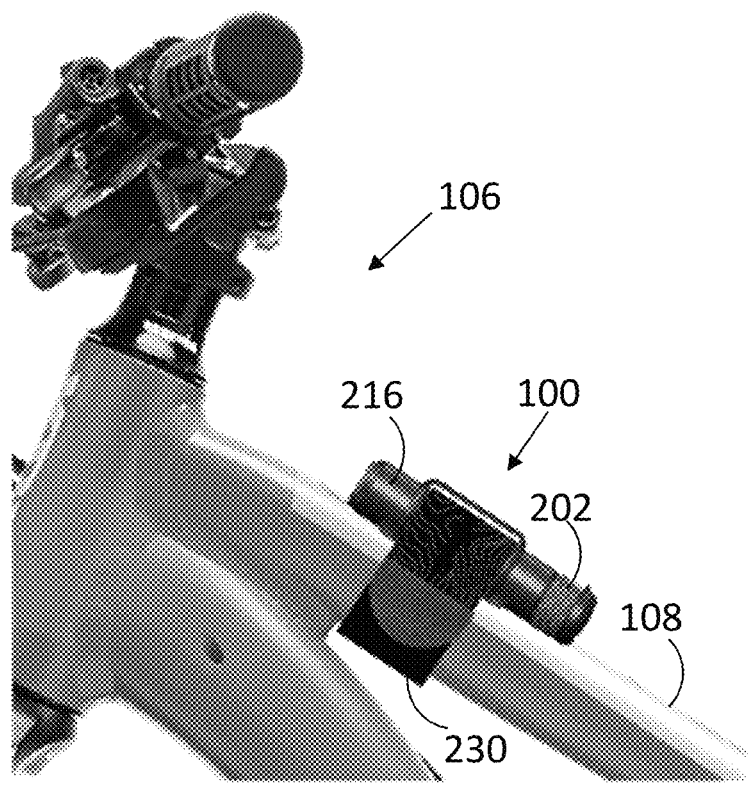
FIG. 6A shows a tire repair tool assembly mounted on a bicycle with a strap of the tire repair tool assembly.
Figure 6B:
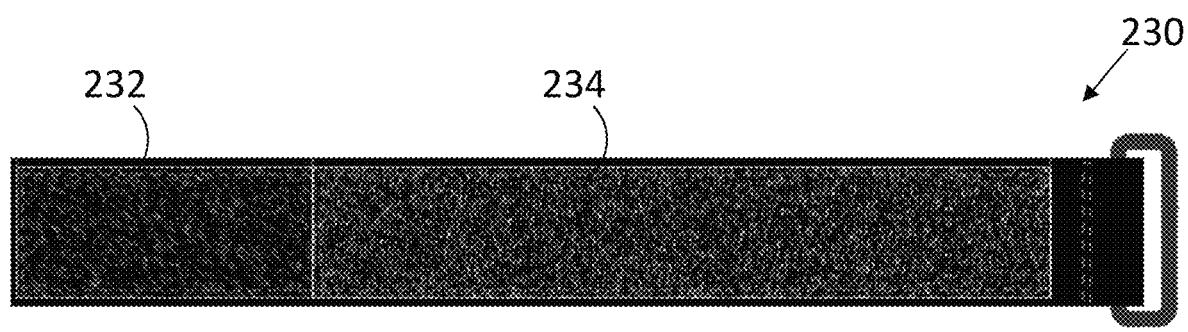
FIG. 6B is a rear view of the strap shown in FIG. 6A.
Figure 6C:
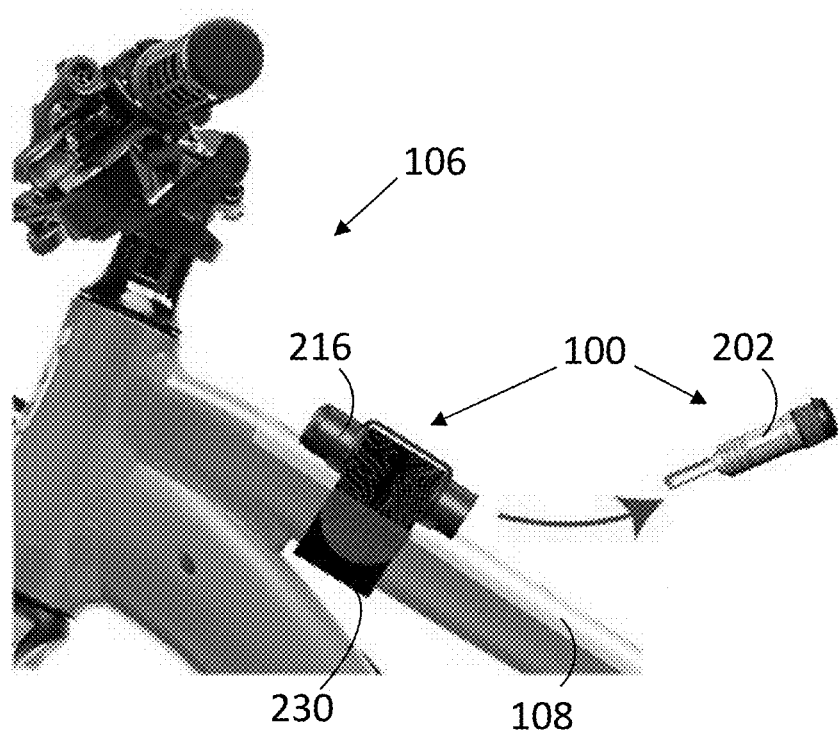
FIG. 6C shows the tool body of the tire repair assembly shown in FIG. 6A is pulled apart from the tool body case.

The tire repair tool assembly 100 can be stored inside a bag, pocket, or jersey, or even be mounted on a bicycle or other objects. For the specific embodiment shown in FIGS. 2A and 2B, the tool body case 216 further comprises a bracket 224 on a first external sidewall 228 of the tool body case 216. The bracket 224 forms a passage 226 between the bracket 224 and the tool body case 216. The tire repair tool assembly 100 further comprises a strap sized to pass through the passage 226 for mounting the tire repair tool assembly 100 to the bicycle 106 (FIG. 6A-6C) or an object such as a bar or loop (not shown). The strap 230 includes a first part 232 and a second part 234. The first part 232 and the second part 234 have corresponding hook-n-loop structures or sticky parts so that the first part 232 and the second part 234 stick to each other and the strap forms a loop and mounts the tire repair tool assembly 100 to a bicycle 106 or other objects. Mounting the tire repair tool assembly to a bicycle provides a quickly-accessible repair tool for a rider. When the tire repair tool assembly 100 is mounted to a bicycle 106, the tool body 202 can be conveniently removed from the tool body case 216 and be used to quickly repair the puncture. With the tire repair tool assembly 100 mounted, the rider can also avoid losing the tool assembly from riding over tough terrain. This quickly-accessible configuration of the tire repair tool assembly, together with preloaded plugs and easily-accessible spare plugs, save time and provide a tool to quickly and effectively block air from leaking through the puncture.

Figure 5B:
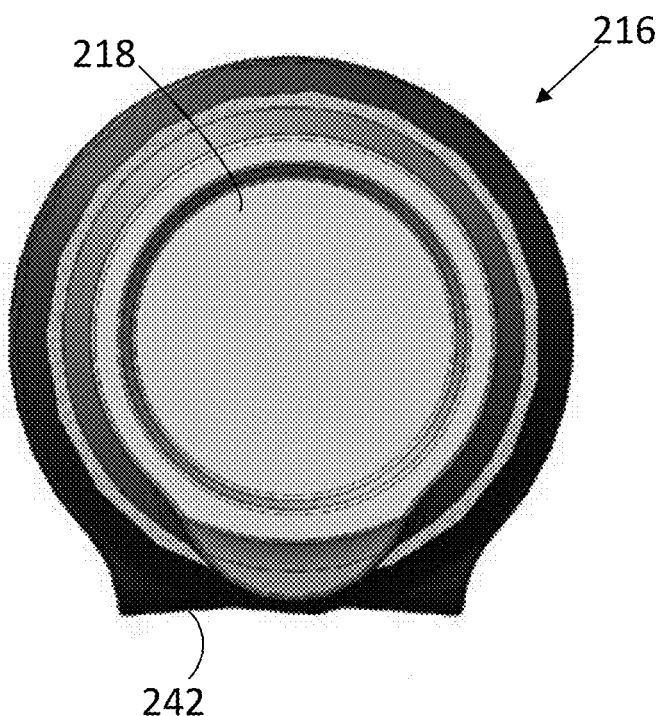
FIG. 5B is a rear view of the tool body case shown in FIG. 5A with the end cap placed on the tool body case.
Figure 5C:
FIG. 5C is a rear perspective view of the tool body case shown in FIG. 5B with a strip of the tool body case pulled apart from the tool body case.

The tool body case 216 may further comprise a strip 502 disposed along a second external sidewall 242 of the tool body case 216 (FIG. 5C). The strip 502 may be made of foam, sponge, or rubber for increasing the grip of the tire repair tool assembly and dampening the movement of the tire repair tool assembly 100 during a ride if the tire repair tool assembly is mounted. The second external sidewall 242 may be concave to conform to the shape of the tube 108 of a bicycle 106 (FIGS. 5B and 6A) and further reduce the movement of the tire repair tool assembly 100 during a ride.

The tire repair tool assembly 100 can be used to repair any tubeless tire used in bicycles, unicycles, tricycles, motorcycles, automobiles, all-terrain vehicles, or any vehicles or mobile machines. The sizes and types of the plugs and the size of the tire repair tool assemblies may vary depending on the sizes and types of tires used on the vehicles or mobile machines.

Figure 7:
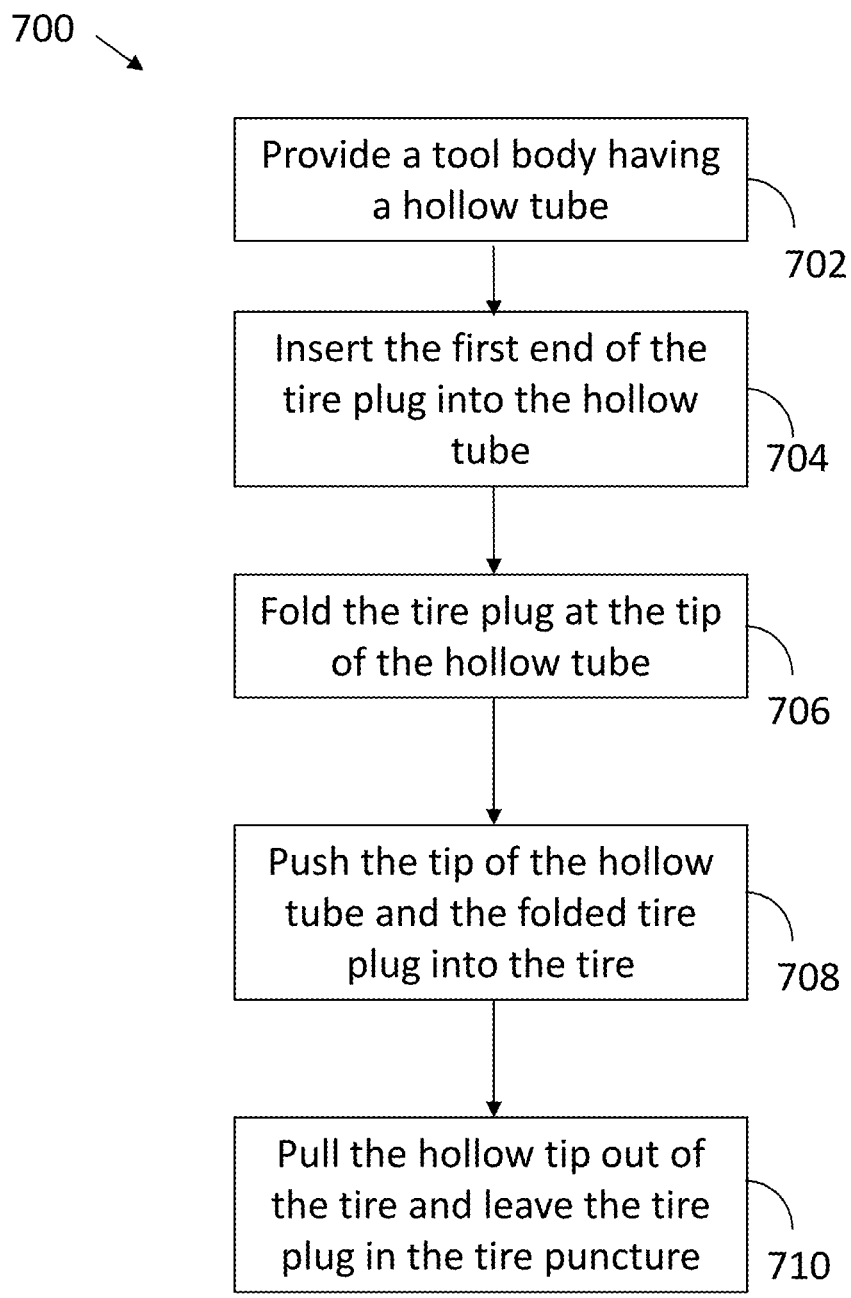
FIG. 7 is a flow chart of a method of repairing a tire puncture.

Methods of repairing a tire puncture are also provided herein. FIG. 7 illustrates an additional example of a method of repairing a tire puncture (700). The method 700 comprises providing a tool body having a hollow tube (702), where the hollow tube is sized to receive a first end of a tire plug within the hollow tube, extends from the tool body, and has a tip distal from the tool body. The method 700 further comprises inserting the first end of the tire plug into the hollow tube (704), folding the tire plug at the tip of the hollow tube such that a remaining portion of the tire plug extends along the outer surface of the hollow tube for a length of the remaining portion of the tire plug (706), pushing the tip of the hollow tube and the folded tire plug into a tire through the tire puncture until only a portion of the remaining portion of the tire plug remains outside of the tire (708), and pulling the hollow tube out of the tire puncture and leaving the tire plug in the tire puncture (710).

In some embodiments, inserting the first end of the tire plug into the hollow tube (704) may further comprise inserting two tire plugs into the hollow tube. The tip may be an angled tip having a first side longer than a second side of the angled tip, and folding the tire plug at the tip of the hollow tube (706) may further comprise folding the tire plug around the second side of the angled tip so that the first side extends beyond the folded tire plug. The method 700 may further comprise removing the tire plug from a storage compartment within the tool body prior to inserting the first end of the tire plug into the hollow tube. The method 700 may further comprise exposing the tip of the hollow tube from within an open compartment of a tool body case enclosing the hollow tube prior to inserting the first end of the tire plug into the hollow tube.

This disclosure, its aspects and implementations, are not limited to the specific components or assembly procedures disclosed herein. Many additional components and assembly procedures known in the art consistent with the tire repair tool assemblies, and methods of repairing a tire puncture will become apparent for use with implementations of the apparatus and methods in this disclosure. In places where the description above refers to particular implementations of tire repair tool assemblies, it should be readily apparent that a number of modifications may be made without departing from the spirit thereof and that these implementations may be applied to other tire repair tool assemblies. The presently disclosed implementations are, therefore, to be considered in all respects as illustrative and not restrictive, the scope of the disclosure being indicated by the appended claims rather than the foregoing description. All changes that come within the meaning of and range of equivalency of the description are intended to be embraced therein. Accordingly, for example, although particular tire repair tool assemblies and methods of repairing a tire puncture are disclosed, such apparatus, methods, and implementing components may comprise any shape, size, style, type, model, version, class, grade, measurement, concentration, material, quantity, the like as is known in the art for such apparatus, methods, and implementing components, and/or the like consistent with the intended operation of the tire repair tool assemblies, and methods of repairing a tire puncture may be used.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

The invention claimed is:

1. A tire repair tool assembly comprising:
   a tool body having a first end and a second end opposite the first end, the tool body having a storage compartment within the tool body, the storage compartment having an opening at the first end;
   at least one tire plug coupled to a first tire plug sheet within the storage compartment;
   a plug storage cap removably coupled to the first end of the tool body;
   a hollow tube sized to receive a first end of the at least one tire plug within the hollow tube, the hollow tube extending from the second end of the tool body and having an angled tip distal from the second end of the tool body; and
   a tool body case comprising a closed end and an open compartment within the tool body case, the open compartment sized to receive and enclose the hollow tube and the second end of the tool body within the open compartment while the hollow tube extends from the second end of the tool body, the tool body case configured to be coupled to the tool body at a location between the first end of the tool body and the second end of the tool body to removably retain a majority of the tool body within the tool body case.

2. The tire repair tool assembly of claim 1, wherein the at least one tire plug is covered with adhesive.

3. The tire repair tool assembly of claim 2, further comprising a second tire plug sheet coupled to the at least one tire plug so that the at least one tire plug is between the first tire plug sheet and the second tire plug sheet.

4. The tire repair tool assembly of claim 1, wherein the closed end of the tool body case comprises a removable end cap adapted to open the closed end of the tool body case and expose the angled tip of the hollow tube.

5. The tire repair tool assembly of claim 1, wherein the tool body case further comprises a bracket on a first external sidewall of the tool body case, the bracket forming a passage between the bracket and the tool body case, the bracket configured to receive a strap through the passage to attach the tool body case to a bicycle.

6. The tire repair tool assembly of claim 5, further comprising a strap sized to pass through the passage for mounting the tire repair tool assembly to a bicycle.

7. The tire repair tool assembly of claim 1, wherein the tool body is rotatably coupled or friction fit to the tool body case.

8. A tire repair tool assembly comprising:
   a tool body having a first end and a second end opposite the first end, the tool body having a storage compartment within the tool body, the storage compartment having an opening at the first end;
   at least one tire plug within the storage compartment;
   a plug storage cap operably coupled to the first end of the tool body; and
   a hollow tube sized to receive a first end of the at least one tire plug within the hollow tube, the hollow tube extending from the second end of the tool body and having a tip distal from the second end of the tool body, wherein the tip is an angled tip having a first side longer than a second side of the angled tip;
   a tool body case comprising a closed end an open compartment within the tool body case, the open compartment sized to receive and enclose the hollow tube and the second end of the tool body within the open compartment while the hollow tube extends from the second end of the tool body, the tool body case configured to be removably coupled to the tool body at a location between the first end of the tool body and the second end of the tool body and to removably retain the tool body within the tool body case.

9. The tire repair tool assembly of claim 8, wherein the closed end of the tool body case comprises a removable end cap adapted to open the closed end of the tool body case and expose the tip of the hollow tube.

10. The tire repair tool assembly of claim 8, wherein the tool body case further comprises a strip disposed along a second external sidewall of the tool body case.

11. The tire repair tool assembly of claim 8, wherein the tool body case further comprises a bracket on a first external sidewall of the tool body case, the bracket forming a passage between the bracket and the tool body case, the bracket configured to receive a strap through the passage to attach the tool body case to a bicycle.

12. The tire repair tool assembly of claim 11, further comprising a strap sized to pass through the passage for mounting the tire repair tool assembly to a bicycle.

13. The tire repair tool assembly of claim 8, wherein the tool body is rotatably coupled or friction fit to the tool body case.

14. The tire repair tool assembly of claim 8, wherein the at least one tire plug is covered with adhesive.

* * * * *